(12) United States Patent
Meyer et al.

(10) Patent No.: US 9,197,375 B2
(45) Date of Patent: *Nov. 24, 2015

(54) METHOD AND ARRANGEMENT IN A TELECOMMUNICATION SYSTEM FOR HANDLING STATUS INFORMATION OF DATA UNITS

(71) Applicant: Optis Cellular Technology, LLC, Plano, TX (US)

(72) Inventors: Michael Meyer, Aachen (DE); Johan Torsner, Masaby (FI); Henning Wiemann, Aachen (DE)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,711

(22) Filed: Jan. 21, 2014

(65) Prior Publication Data

US 2014/0133341 A1    May 15, 2014

Related U.S. Application Data (63) Continuation of application No. 12/866,534, filed as application No. PCT/SE2008/051047 on Sep. 18, 2008, now Pat. No. 8,687,548.

(60) Provisional application No. 61/027,110, filed on Feb. 8, 2008.

(51) Int. Cl.
*H04L 1/16* (2006.01)
*H04L 1/18* (2006.01)

(52) U.S. Cl.
CPC ............ *H04L 1/1628* (2013.01); *H04L 1/1657* (2013.01); *H04L 1/1809* (2013.01)

(58) Field of Classification Search
CPC .... H04L 1/1628; H04L 1/1657; H04L 1/1809
USPC ...................... 370/310.2, 314, 328, 338, 341, 370/342–347; 455/434, 435.3, 450, 515
See application file for complete search history.

(56) References Cited

U.S. PATENT DOCUMENTS

| | | |
|---|---|---|
| 6,772,215 B1 | 8/2004 | Rathonyi et al. |
| 7,720,043 B2 | 5/2010 | Meylan et al. |
| (Continued) | | |

FOREIGN PATENT DOCUMENTS

| | | |
|---|---|---|
| CN | 1714527 A | 12/2005 |
| CN | 1921368 A | 2/2007 |
| (Continued) | | |

OTHER PUBLICATIONS

Alcatel-Lucent, "Clarification on RLC Status Report", 3GPP TSG RAN WG2 #61, Feb. 11-15, 2008, Sorrento, Italy, R2-080926.

(Continued)

*Primary Examiner* — Siming Liu
(74) *Attorney, Agent, or Firm* — Vincent J. Allen; Stephen Y. Liu; Carstens & Cahoon, LLP (57) ABSTRACT

A method is provides in a receiving node for handling status information of data units transmitted from a sending node to the receiving node over a radio link. The receiving node establishes (401) that a number of data units that has been transmitted by the sending node are missing. The receiving node sends (402) a reduced status message to the sending node over the radio link, which message is reduced such that it comprises the negative acknowledgement for a first part of missing data units and omits negative acknowledgements for the rest of the missing data units. The omitted negative acknowledgement for the rest of the missing data units will not erroneously be interpreted as correctly received data units by the sending node.

19 Claims, 4 Drawing Sheets

(56) References Cited

U.S. PATENT DOCUMENTS

| | | | |
|---|---|---|---|
| 8,687,548 B2* | 4/2014 | Meyer et al. | 370/328 |
| 2005/0042985 A1 | 2/2005 | Cheng et al. | |
| 2009/0203374 A1 | 8/2009 | Chun et al. | |

FOREIGN PATENT DOCUMENTS

| | | | |
|---|---|---|---|
| CN | 101030840 A | 9/2007 | |
| EP | 0658028 A2 | 6/1995 | |
| JP | H07202856 A | 8/1995 | |
| JP | 2007324700 A | 12/2007 | |
| KR | 100365356 B1 | 12/2002 | |
| KR | 20050118591 A | 12/2005 | |
| KR | 20060115175 A | 11/2006 | |
| KR | 20070037979 A | 4/2007 | |
| RU | 2267225 C2 | 12/2005 | |
| WO | 2004043018 A1 | 5/2004 | |
| WO | 2006126960 A1 | 11/2006 | |
| WO | 2009096743 A2 | 8/2009 | |

OTHER PUBLICATIONS

Gong, F. et al., "A New Error Control Scheme for High Speed Networks", Proceedings of the Tactical Communications Conference, May 10, 1994, pp. 437-448, vol. 1, New York US.

Li, H. et al., "Automatic Repeat Request (ARQ) Mechanism in HIPERLAN/2", 2000 IEEE 51st Vehicular Technology Conference Proceedings (VTC 2000-Spring), 2000, pp. 2093-2097, vol. 3, Tokyo, Japan.

Extended European Search Report, International Application No. 11178461, report completed Sep. 7, 2011, 7 pages.

International Preliminary Report on Patentability, Application No. PCT/SE2008/051047, report completed on Feb. 17, 2010, 9 pages.

International Search Report, Application No. PCT/SE2008/051047, mailed Mar. 6, 2009, 4 pages.

LG Electronics Inc., "Logical channel prioritization for RLC Status PDU", 3GPP TSG WG2 #61, Feb. 11-15, 2008, Sorrento, Italy, R2-080905, 2 pages.

Written Opinion of the International Searching Authority, Application No. PCT/SE2008/051047, Mar. 6, 2009, 6 pages.

Third Generation Partnership Project, 3GPP TS 36.322, V8.2.0, "Evolved Universal Terrestrial Radio Access (EULTRA) Radio Link Control (RLC) protocol specification (Release 8)," dated May 2008, 36 pages.

Decision on Grant, RU Patent Application No. 2010137316/08(053114), dated 2012, 17 pages.

* cited by examiner

METHOD AND ARRANGEMENT IN A TELECOMMUNICATION SYSTEM FOR HANDLING STATUS INFORMATION OF DATA UNITS

RELATED APPLICATIONS

This application is a continuation of U.S. patent application Ser. No. 12/866,534, filed on Aug. 6, 2010, which claims priority from International Patent Application No. PCT/SE2008/051047, filed Sep. 18, 2008, which claims priority from U.S. Provisional Patent Application No. 61/027,110 filed on Feb. 8, 2008, all of which are hereby incorporated by reference herein in their entirety.

TECHNICAL FIELD

The present invention basically relates to the general field of data unit communication comprising a method and an arrangement in a sending node and a method and an arrangement in a receiving node. In particular, it relates to handling status information of data units transmitted from the sending node to the receiving node over a radio link.

BACKGROUND

In today's data unit communication, an amount of data is divided into individual units, and said units are transmitted to a desired receiver over an appropriate communication path. This form of data communication is very well known and in wide use. The sending node may e.g. be a radio base station and the receiving node may be a user equipment such as a mobile phone, portable computer, Personal Digital Assistant (PDA) or vice versa. Most of these systems use bi-directional radio communication where both nodes transmit and receive data units simultaneously or alternating.

Such data units carry a variety of names in the context of different communication systems and communication protocols, such as packets, frames, segment, protocol data units, etc. The term "data unit" as used in the present specification and claims generically refers to any such division of a data amount.

In order to ensure the complete and correct transmission of data units from a transmitting to a receiving protocol peer, a mechanism referred to as ARQ (Automatic Repeat reQuest) is often used. ARQ mechanisms are commonly part of link layer protocols such as the Radio Link Control (RLC) protocol or the Medium Access Control (MAC) protocol specified for the Universal Mobile Telecommunications System (UMTS) Terrestrial Radio Access Network (UTRAN) as well as for the Evolved-UTRAN. When using an ARQ mechanism, the receiver of data units sends feedback messages to the sender, such that the sender can determine whether sent data units were properly received, and if not to appropriately perform retransmissions of data units.

A feedback message is a control data unit that is typically sent from the receiving entity of an ARQ protocol to the transmitting peer entity.

Feedback messages are often referred to as status message, status report, status, etc. They may have different formats depending on the protocol specification. Known implementations of such status messages comprise one or more references to protocol data units, or parts thereof, received or expected by the receiving protocol entity. These references are typically denoted as positive and/or negative acknowledgements and also referred to as ACK or NACK. An acknowledgement provides the transmitting protocol entity with information about successful or unsuccessful reception of one or more data units at the receiving protocol entity. Many of the known ARQ protocols assign a so-called sequence number (SN) to each data unit and use this sequence number as reference in status messages. A positive acknowledgement for the data unit with a given sequence number may then be referred to as ACK_SN whereas a negative acknowledgement may be denoted as NACK_SN. Widely, known protocols use lists and/or bitmaps in status messages. An acknowledgement may be explicit, i.e., represent the state of one particular data unit or it may be cumulative, i.e., provide information about the state of a collection of data units.

The radio link control protocol specified for E-UTRAN uses combinations of the two. In said protocol the positive acknowledgement is cumulative, i.e., it positively acknowledges all data units with a sequence number up to but not including ACK_SN that are not explicitly negatively acknowledged. In the status messages of said protocol a negative acknowledgements is transmitted by means of a NACK_SN field for each not received data unit below ACK_SN.

Data units and control data units such as status messages may comprise a payload section and a header section where the former contains the actual information to be exchanged between the peer protocol entities and the latter carries information needed to decode that information correctly. The header section of a data unit may for example comprise the associated sequence number.

Figure 1:
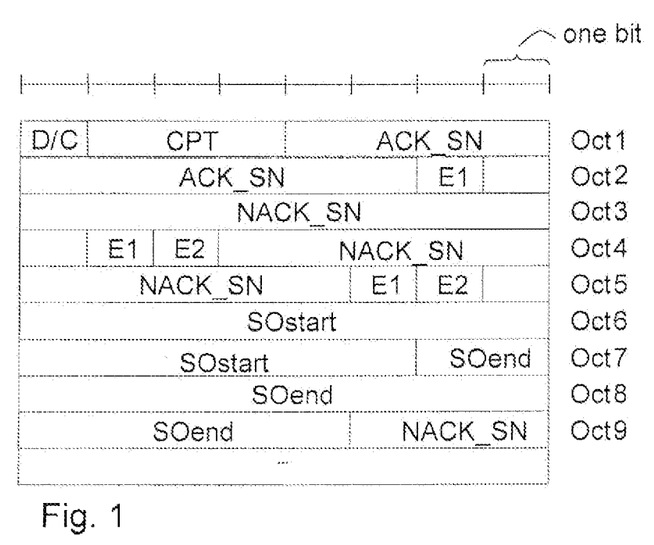
FIG. 1 is a schematic block diagram illustrating a status message according to prior art.

One example of a status message is the LTE RLC STATUS PDU in E-UTRAN disclosed in FIG. 1. In the example of FIG. 1, each row comprises eight bits, i.e. one octet (October 1, October 2, etc.). The data unit comprises a payload section and a header section. The header section comprises a Data/Control (D/C) and a Control PDU Type (CPT) field. The D/C field indicates whether the data unit is an RLC data PDU carrying payload from higher layers or an PLC control PDU, namely a status message. The CPT field indicates the type of the RLC control PDU. The payload section following the header section comprises an ACK_SN field and an extension flag E1. The former carries the sequence number following that of the highest received data unit and it cumulatively acknowledges all data units up to but not including that sequence number which are not negatively acknowledged in the remainder of the status message. The E1 flag indicates whether or not a set of NACK_SN, E1 and E2 follows, The NACK_SN field comprises the sequence number of a data unit which has been detected as missing by the receiving protocol entity, i.e., a negative acknowledgement. The E2 field indicates whether or not a set of SOstart and SOend follows. The SOstart field together with the SOend field indicates the portion of the data unit with SN=NACK_SN (the NACK_SN which the SOstart is related to) that has been detected as lost at the receiving protocol entity. In this example the ACK_SN field as well as all NACK_SN fields comprise 10 bit and can therefore address $2^{10}$=1024 sequence numbers. In order to be able to transmit more data units, a wrap-around mechanism may be used so that the sequence number space can be re-used.

In accordance with the generic description of ARQ mechanisms the transmitting side of an LTE RLC Acknowledged Mode (AM) PLC entity interprets a received STATUS PDU so that all Acknowledge Mode Data (AMD) PDUs up to but excluding the AMD PDU with SN=ACK_SN have been received by its peer AM PLC entity, excluding those AMD PDUs indicated in the STATUS PDU with NACK_SN and also excluding portions of AMD PDUs indicated in the STATUS PDU with NACK_SN, SOstart and SOend.

In general and also in the particular example of LTE RLC the status messages provide the complete status information to the ARQ sender, i.e., the status message comprises information about the entire receive window. Therefore the size of the status message increases with the number of negative acknowledgement to be reported by the receiving protocol entity. Due to varying radio channel quality or inappropriate resource assignments the available radio resources may not be sufficient to transmit an entire status message.

Examples of solutions to the problem that the available resources are too small to send a full status message are to either prioritize status messages to ensure that enough resources are available which implies that other transmissions are delayed, or to postpone the transmission of a status message until sufficient resources are available which would lead to window stalling or increased transmission delays which are also unfavourable. These solutions are likely to lead to situations where the receiver may not be allowed to send any status message due to insufficient radio resources.

SUMMARY

An object of the present invention is to provide a mechanism for improving handling of a status message transmitted from a data unit receiving node to a data unit sending node.

According to a first aspect of the present invention, the object is achieved by a method in a receiving node, for handling status information of data units transmitted from a sending node to the receiving node over a radio link. The receiving node establishes that a number of data units being transmitted by the sending node are missing. The receiving node sends a reduced status message to the sending node over the radio link. The message is reduced such that it comprises the negative acknowledgement for a first part of missing data units and omits negative acknowledgements for the rest of the missing data units. The omitted negative acknowledgement for the rest of the missing data units will not erroneously be interpreted as correctly received data units by the sending node.

According to a second aspect of the present invention, the object is achieved by a method in a sending node, for handling status information of data transmitted from the sending node to the receiving node over a radio link. The sending node transmits a stream of data units over the radio link to the receiving node. The receiving node correctly receives some of the transmitted data units but misses a number of the transmitted data units. The sending node receives a reduced status message from the receiving node over the radio link. The message is reduced such that it comprises the negative acknowledgement for a first part of missing data units and omits negative acknowledgement for the rest of the missing data units. The omitted negative acknowledgement for the rest of the missing data units will not erroneously be interpreted as correctly received data units by the sending node.

According to a third aspect of the present invention, the object is achieved by an arrangement in a receiving node for handling status information of data units, transmitted from a sending node to the receiving node over a radio link. The receiving node arrangement comprises an establishing unit configured to establish that a number of data units that has been transmitted by the sending node are missing and a sending unit configured to send a reduced status message to the sending node over the radio link. The message is reduced such that it comprises the negative acknowledgement for a first part of missing data units and omits negative acknowledgements for the rest of the missing data units. The omitted negative acknowledgement for the rest of the missing data units will not erroneously be interpreted as correctly received data units by the sending node.

According to a fourth aspect of the present invention, the object is achieved by an arrangement in a sending node, for handling status information of data units, transmitted from the sending node to the receiving node over a radio link. The sending node arrangement comprises a sending unit configured to transmit a stream of data units over the radio link to the receiving node. The receiving node correctly receives some of the transmitted data units but misses a number of the transmitted data units. The sending node arrangement further comprises a receiving unit configured to receive a reduced status message from the receiving node over the radio link. The message is reduced such that it comprises the negative acknowledgement for a first part of missing data units and omits negative acknowledgement for the rest of the missing data units. The omitted negative acknowledgement for the rest of the missing data units will not erroneously be interpreted as correctly received data units by the sending node.

Since a reduced status report is used, comprising only the negative acknowledgement for the first part of the sequence numbers of missing data units but omitting negative acknowledgement for sequence numbers of the rest of the missed number of data units, less resources are required for the transmission which in turn implies that the handling of the status report transmitted from the sending node to the receiving node is improved.

Advantages of the present invention comprise that the receiving node interprets the reduced status report correctly and does not advance it's transmit window beyond any not successfully transmitted data units.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement which may be put into practice in the embodiments described below.

Figure 2:
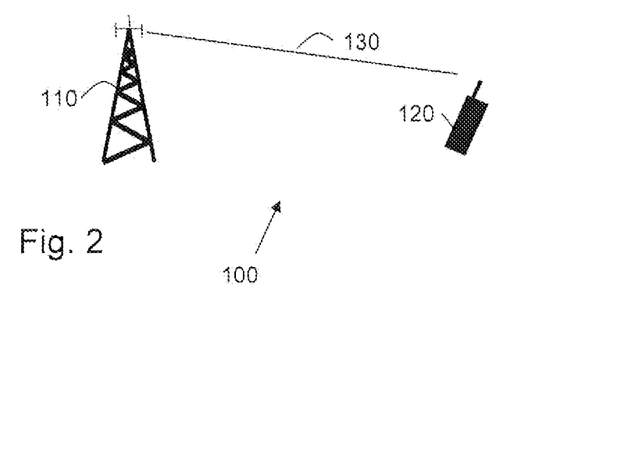
FIG. 2 is a schematic block diagram illustrating a wireless communication system.

FIG. 2 depicts a wireless telecommunication system 100, such as e.g. E-UTRAN, LTE, WCDMA, EDGE, and WLAN. The wireless telecommunication system comprises a sending node 110 and a receiving node 120. The sending node 110 is adapted to transmit data units such as e.g. PDUs over a radio link 130 to the receiving node 120. The sending node 110 may be a base station such as a NodeB, an eNodeB or any other network unit capable to transmit data units to a receiving node 120 over a radio link 130. The receiving node 120 may be a wireless terminal such as a mobile phone, a Personal Digital Assistant (PDA), a user equipment (UE) or any other network node capable of receiving data units from a sending node over a radio link 130. It may also be the opposite, so that the sending node 110 is a wireless terminal and the receiving node 120 is a base station.

To improve throughput, the sending node 110 and the receiving node 120 may use a window based Automatic Repeat request (ARQ) mechanism. In this case the sending node 110 comprises a transmitting window and the receiving node 120 comprises a receiving window. The window mechanism allows the sending node 110 to continuously send data units while waiting for acknowledgements. The window can be seen as a buffer.

The sending node 110 may be informed about the size of the receiving window of the receiving node 120, to enable the sending node 110 to avoid sending more data units than the receiving node 120 can concurrently handle. To do so, the sending node 110 may maintain a lower window edge, holding the sequence number of oldest outstanding data unit for which no positive acknowledgement has been received and an upper window edge holding the sequence number of the next data unit to be transmitted. It further ensures that the distance between the lower and the upper window edge does not exceed the size of the receiver's window. With this prerequisite the sending node 110 can send a whole sender window of data units before receiving an acknowledgement of the first data unit in the window while still ensuring lossless operation and continuous data transmission. Upon reception of acknowledgements the lower edge of the sender window is moved forward such that the first data unit in the window is again the oldest transmitted but not yet acknowledged data unit.

Similarly, the receiving node 120 may maintain a lower window edge holding the sequence number of the oldest outstanding, i.e., next expected data unit and an upper window edge holding the sequence number following that of the highest received data unit. Both, the lower and the upper window edge are advanced when a data unit with the corresponding sequence number has been received. If the lower window edge equals the upper window edge there are no outstanding data units. Otherwise, data units may have been lost or at least re-ordered on lower layers and the receiving node may send a status message towards the sending node 110. Such a status message may comprise a list of sequence numbers of expected but not yet received data units (at least the lower window edge and potentially more) as well as the sequence number of the highest received sequence number (upper window edge) or the sequence number following that depending on the protocol specification.

The following describes some non-limiting and non-exclusive examples how to handling status information of data units transmitted from the sending node 110 to the receiving node 120.

Figure 3:
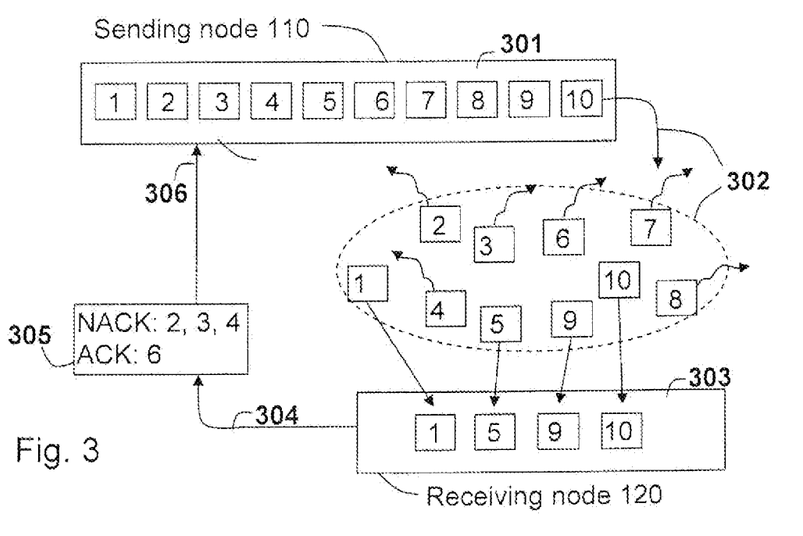
FIG. 3 is a schematic block diagram illustrating embodiments of a method in a wireless telecommunication system.

Referring to FIG. 3, the sending node 110 transmits data units (also referred to as Protocol Data Units, PDUs or packets) to the receiving node 120. Before the transmission, each one of the data units to be transmitted is associated with a sequence number 301 allowing the receiving node 120 to detect re-ordering, to re-establish the data units original order, to detect loss of data units and as a reference to be used in status messages to be sent from the receiving node 120 to the sending node 110.

The sending node 120 then transmits 302 a stream of data units over the radio link 130 to the receiving node 120. In the example of FIG. 3, data units with sequence numbers 1, 2, 3, 4, 5, 6, 7, 8, 9 and 10 are transmitted to the receiving node 120.

A data unit is represented by a square containing the associated sequence number. In the example of FIG. 3, data units with sequence numbers 1, 5, 9 and 10 are correctly received by the receiving node 120 as indicated by straight arrows. Data units with sequence numbers 2, 3, 4, 6, 7 and 8 are not received or not correctly received by the receiving node 120 as indicated by wavy arrows.

If the channel resources allow, the receiving node 120 will send a complete status message to the sending node 110 (not shown in FIG. 3). This complete status message may comprise a negative acknowledgement for each one of the respective data units with sequence numbers 2, 3, 4, 6, 7 and 8, it contains e.g. a NACK_SN field for each missing data unit. The complete status message may further comprise a cumulative positive acknowledgement for the sequence numbers 1, 5, 9 and 10, e.g. an ACK_SN field set to 11 indicating that this is the next expected sequence number outside the receiving window.

When e.g. the channel quality is too poor for sending a complete status message, as assumed in this example depicted in FIG. 3, the receiving node 120 may send 304 a reduced status message to the sending node 110 305, 306, to adapt the transmission to the available channel resources over the radio link 130. According to one example, the receiving node 120 includes in the reduced status message, only as many negative acknowledgements as fit in because of the limited resources while omitting the other negative acknowledgements. In this example the reduced status message any contains three negative acknowledgements, represented e.g. by three NACK_SN fields set to the sequence numbers 2, 3 and 4.

According to a state-of-the-art protocol, a cumulative positive acknowledgement (e.g. ACK_SN) would indicate successful reception of all data units with sequence numbers up to but excluding 11, and excluding those data units for which an explicit negative acknowledgement is contained. A state of the art sending node would consequently interpret the reduced status message so as if the data units with sequence numbers 6, 7 and 8 have been successfully received. It would therefore not perform retransmissions of those data units and may even discard the data from its transmitting window so that no retransmission can be performed later.

To overcome this problem of misunderstanding the cumulative positive acknowledgement (e.g. ACK_SN) may be set differently for a reduced status message compared to a complete status message. According to a first embodiment the positive acknowledgement (e.g. ACK_SN) in a reduced status message is set such that it does not acknowledge any data units with sequence number equal to or larger than the sequence numbers of data units that where omitted in the reduced status message. i.e. the reduced status message comprises positive acknowledgements only for data units with sequence number equal to or smaller than the lowest sequence numbers that was omitted in the reduced status message.

In that way the sending node 110 will not erroneously interpret that the data units missing in the receiving node's window but not reported in said reduced status message as correctly received. In this example this means that the reduced status message 305 shall only positively acknowledge data units 1 and 5, but not data units 9 and 10. According to one embodiment of this example, a method sets the ACK_SN field in the reduced status message to 6 thereby indicating to the sending node 110 the successful reception of all data units up to but riot including sequence number 6 and explicitly excluding sequence numbers 2, 3 and 4. This implies that the sending node 110 receiving 306 the reduced status message will treat it like any complete status message and make the correct status interpretation, i.e., regard the data units with sequence number 1 and 5 as correctly received and retransmit data units with sequence numbers 2, 3 and 4. The sending node 110 does not need to know that the status message is a reduced status message. It however expects further status messages providing information about the other outstanding data units with sequence numbers 6, 7, 8, 9 and 10. As a benefit of this embodiment there is no need for any indicator indicating that the status message is a reduced status message, i.e. that it does not contain negative acknowledgements (e.g. NACK_SNs) for all missing (non-received) data units or segments thereof but only for a sub-set.

In this embodiment it may be preferable not to send another status message before the receiving node 120 is sure that the status message has been received, e.g. after receiving an expected retransmission. To avoid sending another status message, a status prohibit timer may be applied which may be started upon transmission of a data unit and which prevents the receiving node from sending a status message while running.

According to a second embodiment a special identifier comprised in the status message is used to indicate that this is a reduced status message and not a full status message. For example the reduced status message may negatively acknowledge data units (e.g. by means of one or more NACK_SN fields) triggering retransmissions from the sending node 110 to the receiving node 120. However, said identifier may prevent the sending node 110 from interpreting any not explicitly negatively acknowledged data units as successfully acknowledged. This means in particular that the sending node 110 is not allowed to advance the lower edge of its receiving window and from discarding any associated data units. In the example above (not shown) a first reduced status message may contain negative acknowledgements for data units 6, 7 and 8 without being interpreted as a positive (cumulative) acknowledgement for the data units with sequence numbers 1, 2, 3, 4, 5, 9 and 10.

A suitable field to indicate the special format may be the CPT field in e.g. the currently defined status format according to E-UTRAN. A special code point may be defined to indicate such special NACK message.

Several reduced status messages may be sent if the sending rode 110 operates according to this embodiment without causing any harm to the transmission window state even if status messages are re-ordered or lost.

If it is known that the field of acknowledgement (e.g. ACK_SN) should not be interpreted at the sending node 110, it may even be omitted, i.e. a special status message format is used for this purpose which optimizes the size of the status message and would allow transmitting further negative acknowledgements in the given radio resources.

Alternatively, in this particular example the cumulative positive acknowledgement may be set to the upper edge of the receiving window (ACK_SN=11 in this example) indicating to the sending node that at least (a segment of) the data unit with sequence number 10 has been received.

Often a status message is requested by the sending node 110 using a poll flag included in a data unit. This is typically done in order to advance the sender window. In that case a status message according to the second embodiment comprising only negative acknowledgement but preventing the sending node 110 from advancing its transmission window does not help.

According to a third embodiment, a special identifier comprised in the status message is used to indicate that this is a reduced status message and not a full status message. Upon reception of this status message the sending node 110 may advance the lower edge of the transmission window up to the lowest negatively acknowledged data unit. It may however not advance it beyond the highest negatively acknowledged sequence number unless it receives another status message allowing it to do so.

Special means such as a status prohibit timer in the receiving node 120 must ensure that the receiving node 120 sends only one reduced status messages comprising only a sub-set of the negative acknowledgements.

In the example above (not shown in the figure) the reduced status message would in addition to the special identifier contain negative acknowledgement for the data units with sequence numbers 2, 3 and 4. The sending node 110 can move the lower edge of the window up sequence number 2, i.e., remove the data unit with sequence number 1 from the transmission window.

According to a fourth embodiment, if several reduced status messages are needed to report all missing data units, a special status message type may be defined for the first reduced status message comprising negative acknowledgement closest to the lower window edge and a second special status message type may be defined for the following reduced status messages comprising any other negative acknowledgements.

Only a reduced status message of the first special status message format allows the sending node 110 to advance the lower window edge up to the first negatively acknowledged sequence number whereas the reduced status message of the second special status message format must not be used to advance the transmission window.

In this embodiment the cumulative positive acknowledgement field is not needed and may be removed from the special status message formats in order to save transmission resources.

In the example above (not shown in the figure) the first reduced status message would comprise negative acknowledgements for the data units with sequence numbers 2, 3 and 4. A reduced status message of the second special status message format comprises negative acknowledgements for the data units with sequence numbers 6, 7 and 8.

Figure 4:
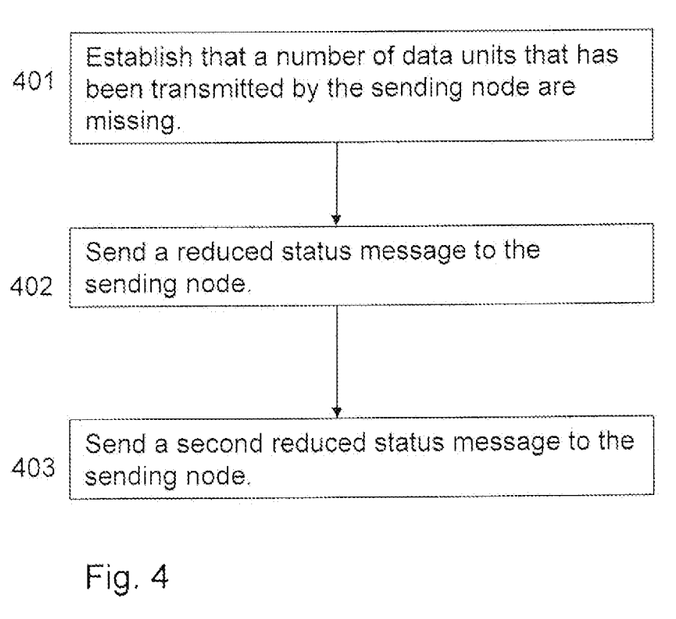
FIG. 4 is a flow chart illustrating, embodiments of a method in a receiving node.

The method steps in the receiving node 120 for handling status information of data units or data unit segments "data units" transmitted from the sending node 110 to the receiving node 120 over a radio link 130 according to some embodiments will now be described with reference to a flowchart depicted in FIG. 4. The method comprising the steps of:

401. The receiving node 120 establishes that a number of data units 2, 3, 4, 6, 7, 8 that has been transmitted by the sending node 110 are missing.

402. The receiving node 120 sends a reduced status message to the sending node 120 over the radio link. The message is reduced such that it comprises the negative acknowledgement for a first part 2, 3, 4 of missing data units and omits negative acknowledgements for the rest 6, 7, 8 of the missing data units. The omitted negative acknowledgement for the rest 6, 7, 8 of the missing data units will not erroneously be interpreted as correctly received data units by the sending node 110.

In some embodiments the negative acknowledgement for the first part 2, 3, 4 of missing data units comprised in the reduced status message is represented by as many negative acknowledgements as fitted in the reduced status message because of limited resources.

The receiving node 120 may use a receiving window. In some embodiments the negative acknowledgement for the fist part 2, 3, 4 of the missing data units, are the missing data units which are closest to a lower edge of the receiving window.

In some embodiments the reduced status message positively acknowledges data units up to but not including the first missing data unit for which a negative acknowledgement was omitted in the reduced status message.

In one embodiment, the positively acknowledgement is performed by setting an ACK_SN field to the first missing data unit for which a negative acknowledgement was omitted in the reduced status message, meaning that data units with sequence numbers up to but not including the first missing data unit for which a negative acknowledgement was omitted, are acknowledged.

In some embodiments the reduced status message comprises an indication that no correctly received data units 1, 5,9,10 will be acknowledged in the reduced status message such that only negative acknowledged data units will be triggered to be retransmitted by the sending node 110. A special format of the reduced status message may be the indication that no correctly received data units 1, 5,9,10 will be acknowledged in the reduced status message in some embodiments the field of acknowledgement in the reduced status message is not used for acknowledgement, but is instead used for a further negative acknowledgement.

403. This is an optional step. In some embodiments a first special status message type is used for the reduced status message comprising the negative acknowledgement for the first part 2, 3, 4 of missing data units closest to a lower edge of the receiving window. In this step the receiving node 120 may send a second reduced status message to the sending node 120 over the radio link 130 using a second special status message type. The second reduced status message comprises at least one of the omitted negative acknowledgements for the rest 6, 7, 8 of the missing data units.

Figure 5:
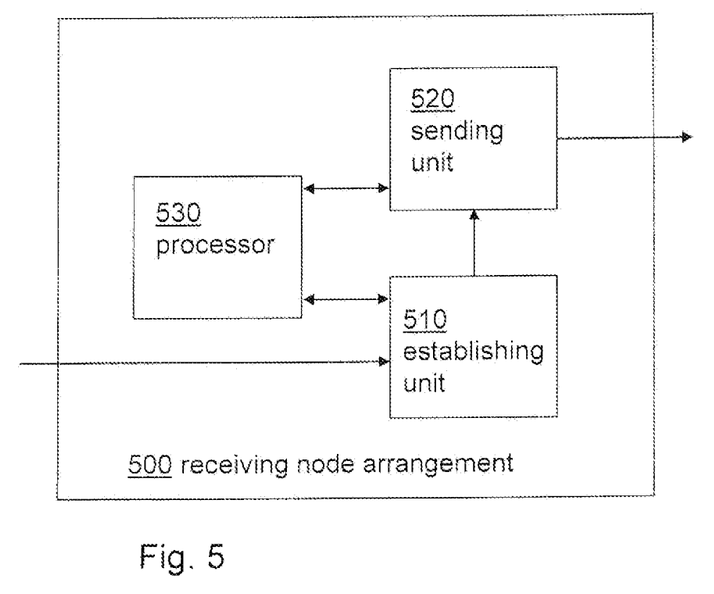
FIG. 5 is a schematic block diagram illustrating embodiments of a receiving node arrangement.

To perform the method steps above for handling status information of data units or data unit segments "data units" transmitted from the sending node 110 to the receiving node 120 over the radio link 130, the receiving node 120 comprises an arrangement 500 depicted in FIG. 5.

The receiving node arrangement 500 comprises an establishing unit 510 configured to establish that a number of data units 2, 3, 4,6,7,8 that has been transmitted by the sending node (110) are missing.

The receiving node arrangement 500 further comprises a sending unit 520 configured to send a reduced status message to the sending node 120 over the radio link. The message is reduced such that it comprises the negative acknowledgement for a first part 2, 3, 4 of missing data units and omits negative acknowledgements for the rest 6, 7, 8 of the missing data units. The emitted negative acknowledgement for the rest 6, 7, 8 of the missing data units will not erroneously be interpreted as correctly received data units by the sending node 110.

The negative acknowledgement for the first part 2, 3, 4 of missing data units comprised in the reduced status message may be represented by as many negative acknowledgements as fitted in the reduced status message because of limited resources.

The receiving node 120 may use a receiving window and in some embodiments the negative acknowledgement for the fist part 2, 3, 4 of the missing data units, are the missing data units which are closest to a lower edge of the receiving window.

A first special status message type may be arranged to be used for the reduced status message comprising the negative acknowledgement for the first part 2, 3, 4 of missing data units closest to a lower edge of the receiving window. The sending unit 520 may further be configured to send a second reduced status message to the sending node 120 over the radio link 130 using a second special status message type. The second reduced status message is arranged to comprise at least one of the omitted negative acknowledgements for the rest (6, 7, and 8) of the missing data units.

In some embodiments the reduced status message is arranged to positively acknowledge data units up to but not including the first missing data unit for which a negative acknowledgement was omitted in the reduced status message.

In one embodiment the positively acknowledgement is arranged to be performed by setting a ACK_SN field to the first missing data unit for which a negative acknowledgement was omitted in the reduced status message, meaning that data units with sequence numbers up to but not including the first missing data unit for which a negative acknowledgement was omitted, are acknowledged.

In some embodiments the reduced status message is arranged to comprise an indication that no correctly received data units 1, 5,9,10 will be acknowledged in the reduced status message such that only negative acknowledged data units will be triggered to be retransmitted by the sending node 110. A special format of the reduced status message may be the indication that no correctly received data units 1, 5,9,10 will be acknowledged in the reduced status message.

In some embodiments, the field of acknowledgement in the reduced status message is not used for acknowledgement, but is instead arranged to be used for a further negative acknowledgement.

Figure 6:
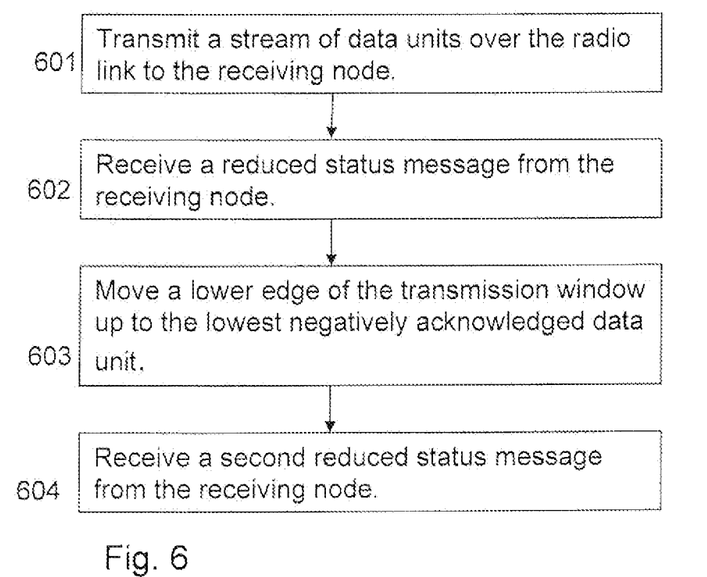
FIG. 6 is a flow chart illustrating embodiments of a method in a sending node.

The method steps in the sending node 110, for handling status information of data units or data unit segments "data units" transmitted from the sending node 110 to the receiving node 120 over the radio link 130, according to some embodiments will now be described with reference to a flowchart depicted in FIG. 6. The method comprises the steps of:

601. The sending node 110 transmits a stream of data units or data unit segments 1, 2,3,4,5,6,7,8,9,10, over the radio link 130 to the receiving node 120. The receiving node 120 correctly receives some of the transmitted data units 1, 5,9,10 but misses a number of the transmitted data units 2, 3, 4,6,7,8.

602. The sending node 110 then receives a reduced status message from the receiving node 120 over the radio link 130. The message is reduced such that it comprises the negative acknowledgement for a first pert 2, 3, 4 of missing data units and omits negative acknowledgement for the rest 6, 7, 8 of the missing data units. The omitted negative acknowledgement for the rest 6, 7, 8 of the missing data units will not erroneously be interpreted as correctly received data units by the sending node 110.

In some embodiments, the negative acknowledgement for the first part 2, 3, 4 of missing data units comprised in the reduced status message is represented by as many negative acknowledgements as fitted in the reduced status message because of limited resources.

In some embodiments the negative acknowledgement for the fist part 2, 3, 4 of missing data units are the missing data units which are closest to a lower edge of a receiving window in the receiving node 120.

In some embodiments the reduced status message positively acknowledges data units up to but not including the data unit for which a negative acknowledgement was omitted in the reduced status message.

In one embodiment, the positively acknowledgement is performed by setting an ACK_SN field to the first missing data unit for which a negative acknowledgement was omitted in the reduced status message. This means that data units with sequence numbers up to but not including the first missing data unit, for which a negative acknowledgement was omitted, are acknowledged.

The reduced status message may comprise an indication that no correctly received data units 1, 5, 9, 10 will be acknowledged in the reduced status message such that only negative acknowledged data units will be triggered to be retransmitted. A special format of the reduced status message may be the indication that no correctly received data units 1,5,9,10 will be acknowledged in the reduced status message.

In some embodiments, the field of acknowledgement in the reduced status message is not used for acknowledgement, but is instead used for a further negative acknowledgement.

603. This is an optional step. In some embodiments the sending node 110 uses a transmission window. In this step the sending node 110 moves a lower edge of the transmission window up to the lowest negatively acknowledged data unit.

604. This is also an optional step. In some embodiments a first special status message type is used for the reduced status message comprising the negative acknowledgement for the first part 2, 3, 4 of missing data units closest to a lower edge of the receiving window of the receiving node 120. In this step the sending node receives a second reduced status message from the receiving node 120 over the radio link 130, wherein a second special status message type is used. The second reduced status message comprises at least one of the omitted negative acknowledgements for the rest 6, 7, 8 of the missing data units.

In some embodiments, reception of the reduced status message of the first special status message type allows the sending node 110 to advance the lower transmission window edge up to the first negatively acknowledged sequence number whereas the reduced status message of the second special status message type does not allow advancing the transmission window.

Figure 7:
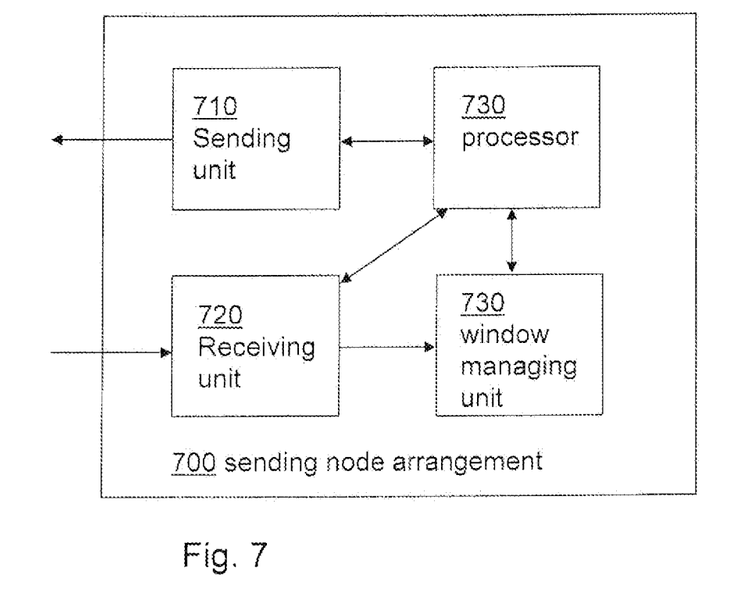
FIG. 7 is a schematic block diagram illustrating embodiments of a sending node arrangement.

To perform the method steps above for handling status information of data units or data unit segments "data units" transmitted from the sending node 110 to the receiving node 120 over a radio link 130, the sending node 110 comprises an arrangement 700 depicted in FIG. 7.

The sending node arrangement 700 comprises a sending unit 710 configured to transmit a stream of data units 1, 2,3,4,5,6,7,8,9,10, over the radio link 130 to the receiving node 120. The receiving node 120 correctly receives some of the transmitted data units 1, 6,9,10 but misses a number of the transmitted data units 2, 3, 4,6,7,8.

The sending node arrangement 700 further comprises a receiving unit 720 configured to receive a reduced status message from the receiving node 120 over the radio link 130. The which message is reduced such that it comprises the negative acknowledgement for a first part 2,3,4 of missing data units and omits negative acknowledgement for the rest 6,7,8 of the missing data units. The omitted negative acknowledgement for the rest 6, 7, 8 of the missing data units will not erroneously be interpreted as correctly received data units by the sending node 110.

In some embodiments the negative acknowledgement for the first part 2, 3, 4 of missing data units comprised in the reduced status message is represented by as many negative acknowledgements as fitted in the reduced status message because of limited resources. The negative acknowledgement for the fist part 2, 3, 4 of missing data units may be the missing data units which are closest to a lower edge of a receiving window in the receiving node 120. Note that sequence numbers may wrap around at some point in time so that "lower" is not relevant any longer. In this document the "lowest sequence number" refers to the sequence number that is closest to the lower window edge. Further, all comparisons may be done modulo to some reference sequence number.

According to some embodiments a first special status message type is used for the reduced status message comprising the negative acknowledgement for the first part 2, 3, 4 of missing data units closest to a lower edge of the receiving window.

The receiving unit 720 may further be configured to receive a second reduced status message from the receiving node 120 over the radio link, wherein a second special status message type is used, and the second reduced status message comprising at least one of the omitted negative acknowledgements for the rest 6, 7, 8 of the missing data units.

In some embodiments the reception of the reduced status message of the first special status message type allows the sending node 110 to advance the lower window edge up to the first negatively acknowledged sequence number whereas the reduced status message of the second special status message type does not allow advancing the transmission window.

In some embodiments the reduced status message positively acknowledges data units up to but not including the data unit for which a negative acknowledgement was omitted in the reduced status message.

In one embodiment the positively acknowledgement is performed by setting an ACK_SN field to the first missing data unit for which a negative acknowledgement was omitted in the reduced status message. This means that data units with sequence numbers up to but not including the first missing data unit, for which a negative acknowledgement was omitted, are acknowledged.

The reduced status message may comprise an indication that no correctly received data units 1, 5,9,10 will be acknowledged in the reduced status message such that only negative acknowledged data units will be triggered to be retransmitted. A special format of the reduced status message may be the indication that no correctly received data units 1, 5,9,10 will be acknowledged in the reduced status message.

In some embodiments the field of acknowledgement in the reduced status message is not used for acknowledgement, but is instead used for a further negative acknowledgement.

The sending node 110 may use a transmission window. In some embodiments the sending node arrangement 700 further comprises a window managing unit 730 configured to move a lower edge of the transmission window up to the lowest negatively acknowledged data unit.

The present mechanism for handling status information of data units transmitted from the sending node 110 to the receiving node 120 over a radio link 130, may be implemented through one or more processors, such as a processor 530 in the sending node arrangement 500 depicted in FIG. 5 or the processor 740 in the receiving node apparatus 700 depicted in FIG. 7, together with computer program code for performing the functions of the present solution. The program code mentioned above may also be provided as a computer program product, for instance in the form of a data carrier carrying computer program code for performing the present solution when being loaded into the sending node 110 or the receiving node 120. One such carrier may be in the form of a CD ROM disc. It is however feasible with other data carriers such as a memory stick. The computer program code can furthermore be provided as pure program code on a server and downloaded to the sending node 110 or the receiving node 120 remotely.

Some examples of the present method may be described as a method a sending node 110 for handling status information of data units transmitted from the sending node 110 to the receiving node 120 over a radio link 130.

The method comprises the step of transmitting a stream of data units or data unit segments over the radio link to the receiving node 120, each data unit being associated with a sequence number. The method comprises the further step of receiving a reduced status message from the receiving node 120. The reduced status message comprises information and an indication that the reduced status massage is reduced and therefore shall not be interpreted as a complete status message.

In some examples, the reduced status message further comprises an indication how is to interpret fields in the reduced status message comprising the information.

The information not being complete, relates to which of the data units and their respective sequence number of the transmitted stream of data units that are received, i.e. acknowledged by the receiving node, and which are not received, i.e. not acknowledged by the receiving node.

Some further examples of the present method may be described as a method in a receiving node 120 for handling status information of data units transmitted from a sending node 110 to the receiving node 120 over a radio link 130.

The method comprises the step of receiving a stream of data units or data unit segments over the radio link from the sending node, each data unit being associated with a sequence number. The method further comprises the step of sending a reduced status message to the sending node. In the reduced status message the acknowledge of a sequence number associated with a data unit, e.g. the ACK_SN, is set such that it does not acknowledge any data units with a respective associated sequence number equal to or larger than the not acknowledge of a sequence number associated with a data unit, e.g. NACK_SNs that is omitted in the reduced status message.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a receiving node for handling status information of data units transmitted from a sending node to the receiving node over a radio link, each data unit having a respective sequence number, the method comprising:
   determining that a number of data units transmitted by the sending node are missing at the receiving node; and
   sending a status message from the receiving node to the sending node over the radio link, the status message comprising negative acknowledgements for a first part of the missing data units and omitting negative acknowledgements for the rest of the missing data units, wherein said sending comprises setting an ACK_SN field of the status message to the sequence number of the first missing data unit for which a negative acknowledgement is omitted from the status message.

2. The method according to claim 1, wherein no more than a defined maximum number of negative acknowledgements fit in the status message, and wherein said sending comprises including negative acknowledgements for said first part of the missing data units by including as many negative acknowledgements as fit in the status message up to said defined maximum number, said defined maximum number being less than the number of missing data units.

3. The method according to claim 2, wherein the receiving node uses a receiving window and wherein said first part of the missing data units are the missing data units which are closest to a lower edge of the receiving window.

4. The method according to claim 1, wherein the receiving node uses a receiving window and wherein said first part of the missing data units are the missing data units which are closest to a lower edge of the receiving window.

5. A method in a sending node for handling status information of data units transmitted from the sending node to a receiving node over a radio link, the method comprising:
   transmitting a stream of data units over the radio link to the receiving node, the receiving node correctly receiving some of the data units but missing a number of the data units, each data unit having a respective sequence number;
   receiving a status message from the receiving node over the radio link, wherein the status message comprises an ACK SN field set to the sequence number of the first missing data unit for which a negative acknowledgment is omitted from the status message; and
   interpreting the status message as including negative acknowledgements for a first part of said missing data units, and as omitting negative acknowledgements for the rest of said missing data units.

6. The method of claim 5, wherein no more than a defined maximum number of negative acknowledgements fit in the status message, and wherein said status message includes as many negative acknowledgements as fit in the status message up to said defined maximum number, said defined maximum number being less than said number of missing data units.

7. The method of claim 6, wherein the status message includes negative acknowledgements for missing data units closest to a lower edge of a receiving window in the receiving node.

8. The method of claim 7, wherein the sending node uses a sending window, and wherein the method further comprises moving a lower edge of the transmission window up to the lowest negatively acknowledged data unit.

9. The method of claim 6, wherein the sending node uses a sending window, and wherein the method further comprises moving a lower edge of the transmission window up to the lowest negatively acknowledged data unit.

10. The method of claim 5, wherein the status message includes negative acknowledgements for missing data units closest to a lower edge of a receiving window in the receiving node.

11. The method of claim 5, wherein the sending node uses a sending window, and wherein the method further comprises moving a lower edge of the transmission window up to the lowest negatively acknowledged data unit.

12. A receiving node for handling status information of data units transmitted from a sending node to the receiving node over a radio link, each data unit having a respective sequence number, the receiving node comprising:
   an establishing circuit configured to establish that a number of data units transmitted by the sending node are missing at the receiving node; and
   a sending circuit configured to send a status message from the receiving node to the sending node over the radio link, the status message comprising negative acknowledgements for a first part of the missing data units and omitting negative acknowledgements for the rest of the missing data units, wherein the sending circuit is configured to set an ACK_SN field of the status message to the sequence number of the first missing data unit for which a negative acknowledgement is omitted from the status message.

13. The receiving node of claim 12, wherein no more than a defined maximum number of negative acknowledgements fit in the status message, and wherein the sending circuit is configured to include negative acknowledgements for said first part of the missing data units by including as many negative acknowledgements as fit in the status message up to said defined maximum number, said defined maximum number being less than the number of missing data units.

14. The receiving node of claim 13, wherein the receiving node uses a receiving window and wherein said first part of the missing data units are the missing data units which are closest to a lower edge of the receiving window.

15. The receiving node of claim 12, wherein the receiving node uses a receiving window and wherein said first part of the missing data units are the missing data units which are closest to a lower edge of the receiving window.

16. A sending node for handling status information of data units transmitted from the sending node to the receiving node over a radio link, the sending node comprising:
 a sending circuit configured to transmit a stream of data units over the radio link to the receiving node, the receiving node correctly receiving some of the data units but missing a number of the data units, each data unit having a respective sequence number;
 a receiving unit configured to receive a status message from the receiving node over the radio link, wherein the status message comprises an ACK SN field set to the sequence number of the first missing data unit for which a negative acknowledgement is omitted from the status message; and
 a processor configured to interpret the status message as including negative acknowledgements for a first part of said missing data units, and as omitting negative acknowledgements for the rest of said missing data units.

17. The sending node of claim 16, wherein no more than a defined maximum number of negative acknowledgements fit in the status message, and wherein said status message includes as many negative acknowledgements as fit in the status message up to said defined maximum number, said defined maximum number being less than said number of missing data units.

18. The sending node of claim 16, wherein the status message includes negative acknowledgements for missing data units closest to a lower edge of a receiving window in the receiving node.

19. The sending node of claim 16, wherein the sending node uses a sending window, and wherein the sending node further comprises a window managing circuit configured to move a lower edge of the transmission window up to the lowest negatively acknowledged data unit.

* * * * *